(12) United States Patent
Bowman et al.

(10) Patent No.: US 9,317,592 B1
(45) Date of Patent: Apr. 19, 2016

(54) CONTENT-BASED CLASSIFICATION

(71) Applicant: Google Inc., Mountain View, CA (US)

(72) Inventors: Courtney Bowman, Mountain View, CA (US); Nicolas Fernando Cabrera, Mountain View, CA (US); Keyon Hedayati, Mountain View, CA (US); Katherine Marie Hotchkiss, Mountain View, CA (US); Stephen Tai-Chung Hu, Mountain View, CA (US); Jared Smith, Mountain View, CA (US); Isaac David Sparrow, Mountain View, CA (US); Jeffrey Michael Stone, Mountain View, CA (US); Juan Bacani Trinidad, Mountain View, CA (US); David Wiesen, Mountain View, CA (US)

(73) Assignee: GOOGLE INC., Mountain View, CA (US)

( * ) Notice: Subject to any disclaimer, the term of this patent is extended or adjusted under 35 U.S.C. 154(b) by 221 days.

(21) Appl. No.: 13/753,066

(22) Filed: Jan. 29, 2013

Related U.S. Application Data

(63) Continuation of application No. 11/394,198, filed on Mar. 31, 2006, now Pat. No. 8,364,467.

(51) Int. Cl.
*G06F 17/30* (2006.01)

(52) U.S. Cl.
CPC ................................ *G06F 17/30705* (2013.01)

(58) Field of Classification Search
CPC ..... G06F 17/27; G06F 17/20; G06F 17/2705; G06F 17/271; G06F 17/2715; G06F 17/272; G06F 17/2725; G06F 17/2735; G06F 17/274; G06F 17/2745; G06F 17/275; G06F 17/2755; G06F 17/276; G06F 17/2765; G06F 17/277; G06F 17/2775; G06F 17/273
USPC ............................. 704/1, 9, 10; 707/706–708
See application file for complete search history.

(56) References Cited

U.S. PATENT DOCUMENTS

| 5,625,748 | A | * | 4/1997 | McDonough et al. | ........ 704/251 |
| 5,666,481 | A | | 9/1997 | Lewis | |
| 5,802,504 | A | | 9/1998 | Suda et al. | |
| 5,864,848 | A | | 1/1999 | Horvitz et al. | |
| 6,249,668 | B1 | | 6/2001 | Abe et al. | |
| 6,389,436 | B1 | | 5/2002 | Chakrabarti et al. | |
| 6,477,551 | B1 | * | 11/2002 | Johnson et al. | ................ 715/202 |
| 6,560,330 | B2 | | 5/2003 | Gabriel | |

(Continued)

FOREIGN PATENT DOCUMENTS

WO         2005/011130         3/2005

OTHER PUBLICATIONS

Co-pending U.S. Appl. No. 11/394,190 entitled "Intelligent Ticket Processing", by Katherine Marie Hotchkiss et al., filed Mar. 31, 2006,67 pages.

*Primary Examiner* — Lamont Spooner
(74) *Attorney, Agent, or Firm* — Young Basile Hanlon & MacFarlane P.C.

(57) ABSTRACT

A classifier may include logic to parse incoming content and to compare a key term in the content to stored content related to multiple prior messages, where the stored content is classified with respect to one or more categories. The logic may produce a score for the content based on the comparing, relate the score to one of the one or more categories, and produce a result based on the comparing, producing, or relating.

23 Claims, 11 Drawing Sheets

(56) References Cited

U.S. PATENT DOCUMENTS

| | | |
|---|---|---|
| 6,628,194 B1 | 9/2003 | Hellebust et al. |
| 6,658,485 B1 * | 12/2003 | Baber et al. .................. 719/314 |
| 6,675,159 B1 | 1/2004 | Lin et al. |
| 6,795,808 B1 | 9/2004 | Strubbe et al. |
| 6,832,244 B1 | 12/2004 | Raghunandan |
| 6,892,193 B2 | 5/2005 | Bolle et al. |
| 7,007,067 B1 | 2/2006 | Azvine et al. |
| 7,089,241 B1 | 8/2006 | Alspector et al. |
| 7,092,888 B1 | 8/2006 | McCarthy et al. |
| 7,134,135 B2 | 11/2006 | Cerami et al. |
| 7,139,754 B2 * | 11/2006 | Goutte et al. ................. 707/740 |
| 7,185,065 B1 * | 2/2007 | Holtzman et al. ............ 709/217 |
| 7,225,139 B1 | 5/2007 | Tidwell et al. |
| 7,281,201 B2 | 10/2007 | Kumar et al. |
| 7,289,609 B2 | 10/2007 | Ganani et al. |
| 7,301,909 B2 | 11/2007 | Langevin et al. |
| 7,320,031 B2 | 1/2008 | Konig et al. |
| 7,496,500 B2 * | 2/2009 | Reed et al. ..................... 704/9 |
| 7,511,603 B2 | 3/2009 | Hellebust et al. |
| 7,590,603 B2 * | 9/2009 | Zhang et al. ................... 706/12 |
| 7,644,057 B2 * | 1/2010 | Nelken et al. .................. 706/55 |
| 7,711,653 B1 | 5/2010 | Denham et al. |
| 7,809,117 B2 * | 10/2010 | Runge et al. ............ 379/88.13 |
| 7,912,186 B2 * | 3/2011 | Howell et al. ............ 379/88.04 |
| 8,364,467 B1 | 1/2013 | Bowman et al. |
| 2002/0022956 A1 | 2/2002 | Ukrainczyk et al. |
| 2002/0032568 A1 * | 3/2002 | Saito ............................. 704/246 |
| 2002/0120702 A1 * | 8/2002 | Schiavone et al. ........... 709/207 |
| 2003/0018659 A1 | 1/2003 | Fuks et al. |
| 2003/0093471 A1 | 5/2003 | Upton |
| 2004/0001098 A1 | 1/2004 | Numano |
| 2004/0128355 A1 | 7/2004 | Chao et al. |
| 2004/0186721 A1 * | 9/2004 | Beynon et al. ................ 704/270 |
| 2004/0254904 A1 * | 12/2004 | Nelken et al. .................. 706/50 |
| 2004/0260534 A1 * | 12/2004 | Pak et al. ......................... 704/7 |
| 2005/0009568 A1 | 1/2005 | Hao et al. |
| 2005/0075886 A1 * | 4/2005 | LeFebvre et al. ............. 704/276 |
| 2005/0187913 A1 | 8/2005 | Nelken et al. |
| 2005/0192992 A1 * | 9/2005 | Reed et al. ..................... 707/101 |
| 2005/0228790 A1 | 10/2005 | Ronnewinkel et al. |
| 2005/0248437 A1 | 11/2005 | Hellebust et al. |
| 2006/0002540 A1 | 1/2006 | Kreiner et al. |
| 2006/0010217 A1 | 1/2006 | Sood |
| 2006/0025995 A1 | 2/2006 | Erhart et al. |
| 2006/0029106 A1 * | 2/2006 | Ott et al. ........................ 370/522 |
| 2006/0029198 A1 | 2/2006 | Dorneich et al. |
| 2006/0161423 A1 * | 7/2006 | Scott et al. ...................... 704/10 |
| 2006/0167824 A1 | 7/2006 | Horvitz |
| 2006/0190588 A1 | 8/2006 | Nakayama et al. |
| 2006/0212524 A1 | 9/2006 | Wu et al. |
| 2007/0043593 A1 | 2/2007 | Provost et al. |
| 2007/0061403 A1 | 3/2007 | Seaburg |
| 2007/0094217 A1 * | 4/2007 | Ronnewinkel .................. 706/52 |
| 2007/0100812 A1 | 5/2007 | Simske et al. |
| 2007/0143101 A1 | 6/2007 | Goutte |
| 2007/0189328 A1 * | 8/2007 | Judd ............................. 370/466 |
| 2009/0063145 A1 | 3/2009 | Hakkani-Tur et al. |

* cited by examiner

| | | CATEGORY ID 610 | |
|---|---|---|---|
| | TOPIC 504 | KEYWORD SET ID 620 | KEYWORDS 508 |
| 650 | POOR AD TARGETING | 003 | NOT RELATED, DO NOT RELATE, NOT RELEVANT, IRRELEVANT, ADS NOT FOR ME, NOT MY TYPE OF ADS |
| 660 | GOOD AD TARGETING | 001 | RELATED, EXACTLY TARGETED, GREAT TARGETING, GOOD TARGETING, MY KIND OF AD, ADS ON POINT |
| 670 | BAD ADS | 004 | HATE THE ADS, BAD ADS, TERRIBLE ADS, POOR ADS, ADS NOT COOL, UNCOOL ADS |
| 680 | GREAT ADS | 001, 002 | COOL ADS, GOOD OFFER, NICE ADS, GREAT ADS, GOOD ADS, I LIKE THE ADS, I LOVE THE ADS, KILLER ADS |

| SENDER ID 710 | MESSAGE ID 720 | CATEGORY 502 | TOPIC 504 | KEYWORD SET ID 620 | SCORE 730 | THRESHOLD STATUS 740 |
|---|---|---|---|---|---|---|
| MARY SMITH | M1 | ADS | BAD ADS | 004 | 75.0% | NOT EXCEEDED |
| JIM@HOME.COM | M2 | PAYMENT | ACCOUNT CREDIT | 125 | 85.4% | EXCEEDED |
| CUSTOMER # 800-445-6789 | M3 | ADS | GREAT ADS | 001, 002 | 45.0% | NOT EXCEEDED |
| BILL'S GUNS CRETE, NE | M4 | ACCOUNTS | OPENING ACCOUNT | 225 | 98.5% | EXCEEDED |

FIG. 7

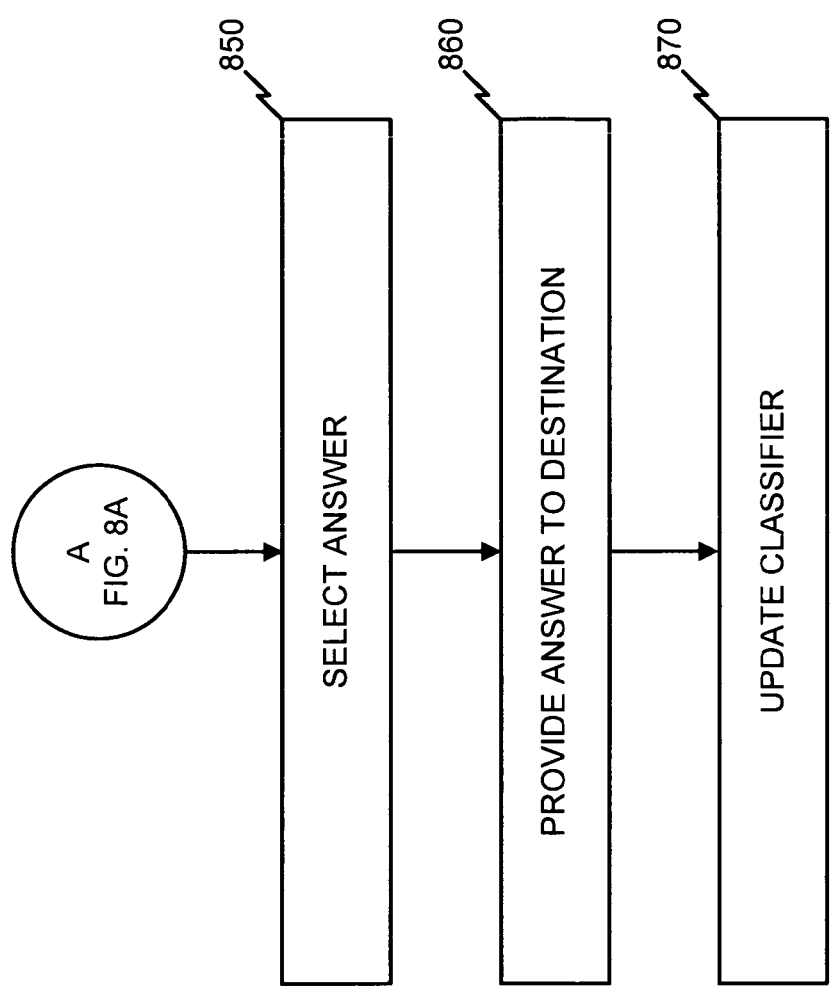

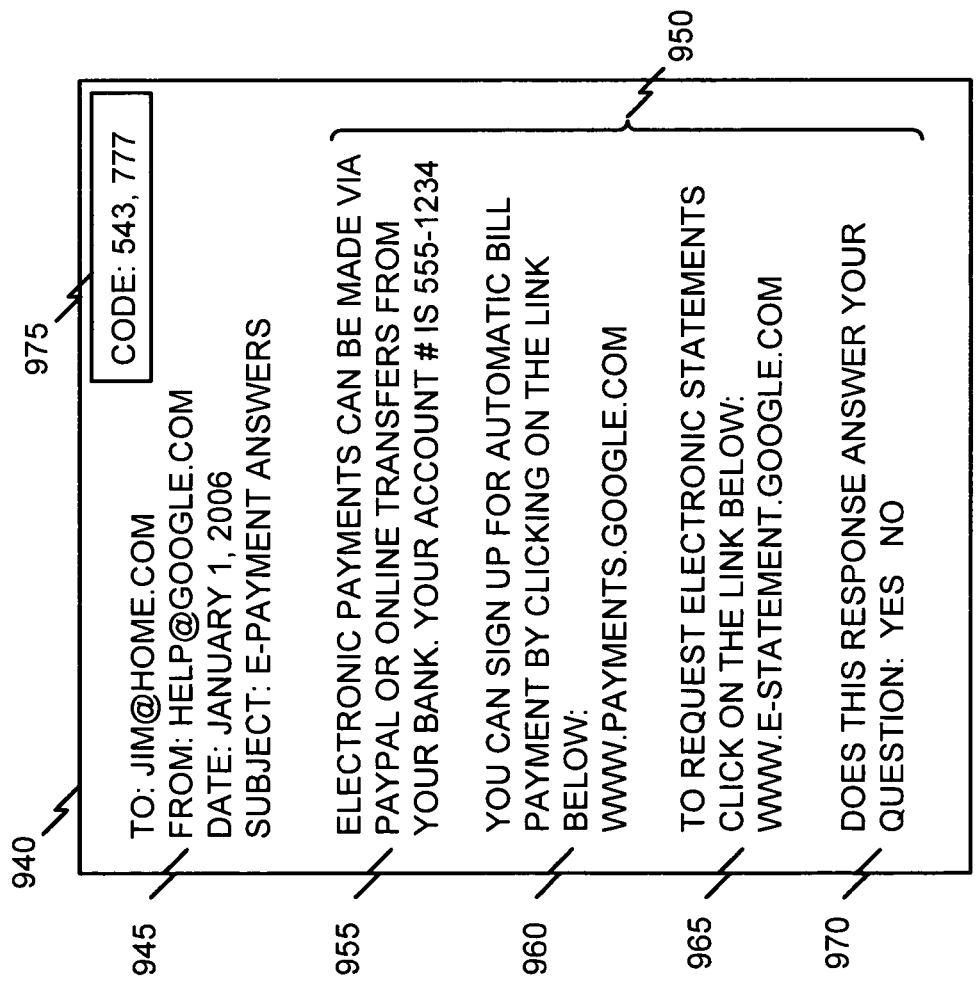

CONTENT-BASED CLASSIFICATION

CROSS-REFERENCE TO RELATED APPLICATIONS/INCORPORATION BY REFERENCE

The present application is a CONTINUATION of U.S. application Ser. No. 11/394,198, filed Mar. 31, 2006, now issued U.S. Pat. No. 8,364,467. The above-identified application is hereby incorporated herein by reference in its entirety.

BACKGROUND

1. Field of the Invention

Implementations relate generally to processing content, and more particularly, to classifying content according to determined criteria.

2. Description of Related Art

Entities, such as corporations, may need to process incoming messages. For example, a corporation may need to process and answer messages from customers. These messages may include topics and may need to be answered according to certain priorities based on these topics to maintain customer satisfaction. For example, a message reporting a service outage may have a higher priority than a message asking about the availability of optional services.

Entities may use customer service representatives to answer incoming messages. Customer service representatives may not be able to identify a topic of an incoming message until the message is operated on by the customer service representative. As a result, customer service representatives have to answer messages on a first come first serve basis or based on another fixed criteria, such as the value of the sender to the entity employing the customer service representative.

Processing messages using a first come first serve basis or based on fixed criteria may be undesirable when messages having a high priority, such as a message reporting a service outage or a lost credit card, are received since these messages may need to be answered out of turn to maintain customer satisfaction.

The types of message processing described above may be inefficient and may require an entity to employ more customer service representatives than would be required if some of the redundant operations could be reduced and/or if customer service representatives could take high priority messages in an order other than a predetermined order.

SUMMARY

In accordance with an implementation, a classifier is provided. The classifier may include a parser to parse incoming content and to compare a key term in the content to stored content related to multiple prior messages, where the stored content is classified with respect to one or more categories. The classifier may include a content processor to produce a score for the content based on the comparing, relate the score to one of the one or more categories, and produce a result based on the comparing, producing, or relating.

In accordance with another implementation, a method for classifying content is provided. The method may include receiving the content and identifying key terms in the content. The method may include comparing the key terms to stored content related to multiple classified messages and compounding probability values for the key terms to obtain an aggregate score for the content. The method may include identifying a category on behalf of the content based on the aggregate score, where the category is related to one of the one or more classified messages, and producing a result for the content based on the identified category.

In accordance with yet another implementation, a computer readable medium that stores instructions executable by a processing device is provided. The computer readable medium may include instructions for identifying key content terms and instructions for comparing the key content terms to stored content that is classified with respect to one or more potential categories. The computer readable medium may include instructions for producing relative Bayesian probabilities for the key content terms based on the comparing and instructions for producing one or more scores for content related to the key content terms, where the one or more scores relate the content to the one or more potential categories and where a highest relative score identifies one of the potential categories as a selected category. The computer readable medium may include instructions for selecting a stored answer related to the selected category, where the stored answer is adapted for use in a reply message produced on behalf of the content.

In accordance with still another implementation, a device is provided. The device may include logic to receive a message and to identify key terms in the message, where the key terms are indicators of the content of the message. The logic may compare the key terms to keywords related to multiple stored classified messages and to determine relative Bayesian probabilities for the key terms based on the comparing. The logic may compound the probabilities for the key terms to produce an aggregate score for the message and identify the message with a category related to one of the multiple stored classified messages based on the aggregate score. The logic may select an answer for the one of the multiple stored classified messages related to the category and send the answer to a destination on behalf of the message as a reply message. The logic may update a database containing the multiple stored classified messages with the message and information in the reply message.

In accordance with yet another implementation, a Bayesian classifier is provided. The classifier may include means for receiving incoming content, means for identifying key terms in the incoming content and means for comparing the key terms to keywords included in stored content related to multiple classified messages. The classifier may include means for producing an aggregate score based on the comparing and means for relating a category to the incoming content based on the score. The classifier may include means for generating a reply that includes answer content from one of the multiple classified messages, where the answer content is identified using the category.

BRIEF DESCRIPTION OF THE DRAWINGS

The accompanying drawings, which are incorporated in and constitute a part of this specification, illustrate one or more embodiments of the invention and, together with the description, explain the invention. In the drawings.

FIG. 6 is a diagram of an exemplary data structure that may be used to store information related to a category consistent with principles of the invention;

FIG. 7 is a diagram of an exemplary data structure that may be used to store information pertaining to incoming messages consistent with principles of the invention;

FIGS. 8A and 8B illustrate an exemplary method for processing incoming messages using content-based classification consistent with principles of the invention; and FIGS. 9A and 9B illustrate an exemplary processing flow for classifying and replying to an incoming message consistent with principles of the invention.

DETAILED DESCRIPTION

Figure 1:
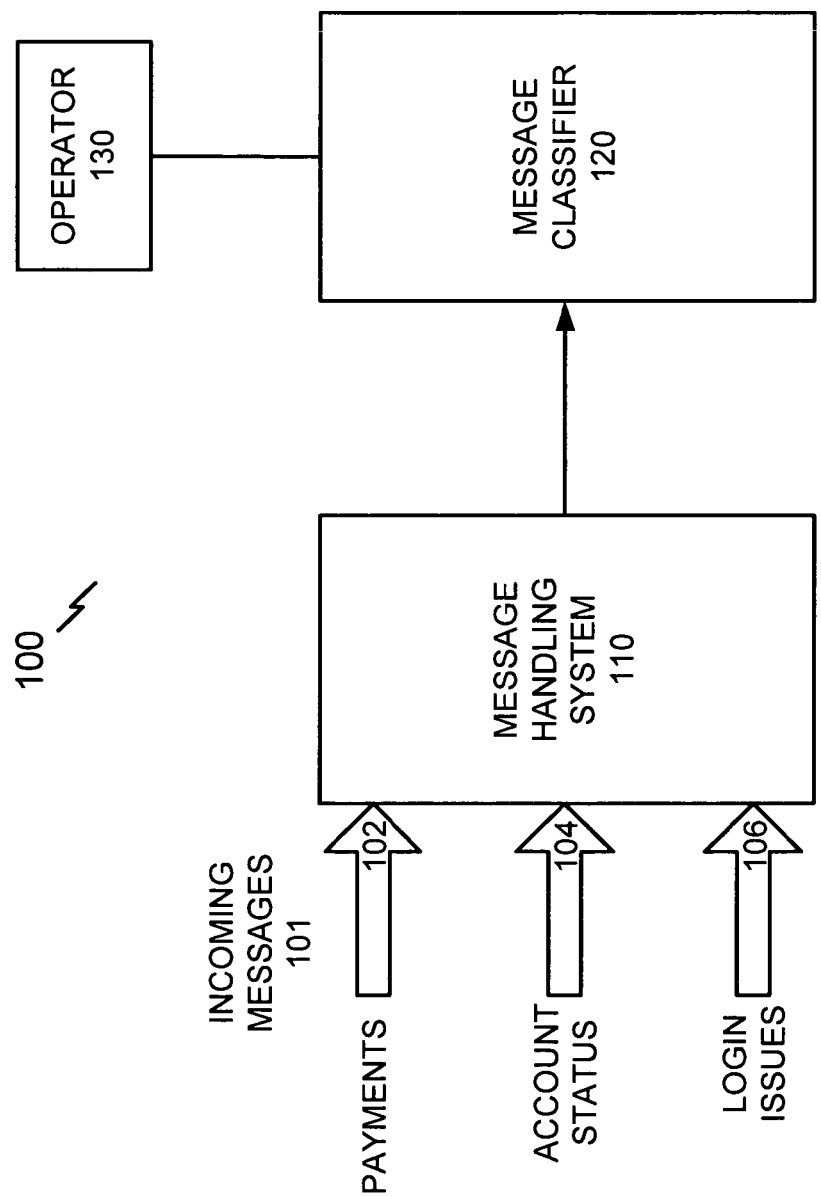
FIG. 1 illustrates an exemplary functional diagram for processing messages using content-based classification consistent with principles of the invention.

The following detailed description of the invention refers to the accompanying drawings. The same reference numbers in different drawings may identify the same or similar elements. Also, the following detailed description does not limit the invention.

Implementations described herein may operate on incoming content, such as content in an incoming message or ticket, using Bayesian techniques and may produce a score for the incoming content that relates the incoming content to one or more categories. For example, a group of categories, or concepts, may be related to a number of stored messages that have been previously classified. A classifier may receive incoming content and may extract a number of words, such as key terms or keywords, from the content, where the extracted words may be related to one or more of the categories. The classifier may calculate individual probabilities for each of the extracted words and may compound the probabilities for the extracted words to produce an overall, or aggregate, score for the incoming content with respect to one of the categories. As used herein, "compounding" may include multiplication as well as other operations performed with respect to probability values related to words, such as key terms and/or keywords. The classifier may repeat the above process for each of the other categories, namely extracting words from the incoming content based on another category, determining probabilities for each of the extracted words, compounding the probabilities of the extracted words, and producing an overall score for the incoming content. The classifier may select the highest overall score and may relate a category to the incoming content based on the highest overall score.

Overview

A corporation, or other entity, may receive thousands of customer related email messages per day. For example, a service provider may receive email messages, instant messages, and/or voice mail messages from customers and non-customers, such as persons inquiring about the corporation's service offerings. As a result, the corporation may have to devote significant resources to processing and answering these messages to maintain customer satisfaction and to grow its business. A corporation may use implementations of the invention to intelligently process incoming messages so that fewer resources, such as customer service representatives, are needed to answer the incoming messages. Implementations may employ Bayesian-based classification techniques to classify incoming messages based on content of the messages. These Bayesian-based classification techniques may improve classification of incoming messages over time since a number of previously classified messages may increase over time.

For example, an implementation may store a number of previously received messages in a database. Content in these stored messages, such as words, may have been previously classified with respect to one or more categories by an operator. Assume that a first stored message may have had its contents classified by the operator as belonging to a payments category and that a second stored message may have had its contents classified as belonging to the payments category and to an account status category. The implementation may receive an incoming message and the content of the incoming message may be compared to the content of some, or all, stored messages. The implementation may assign a score, or activation rate, to the incoming message based on the relative Bayesian probabilities of content portions (e.g., words or phrases) in the incoming message with respect to the categories of the stored messages (e.g., payments and account status). The incoming message may be assigned to one or more categories based on its activation rate with respect to a given category or categories, for which activation thresholds have been specified.

FIG. 1 illustrates an exemplary functional diagram for processing messages consistent with principles of the invention. Incoming messages 101 (hereinafter messages 101) may include substantially any type of message, such as email, voicemail, web-based forms, text and/or voice from on-line chat applications, etc. Messages 101 may be related to particular categories, such as payments 102, account status 104, or login issues 106. A category may represent a high level grouping of information with which messages 101 may be identified to facilitate efficient processing by an operator 130.

Messages 101 may be received by a message handling system 110 that may sort messages 101 into queues (not shown). A queue may be thought of as an inbox and may be used to organize messages 101, such as by placing all messages from a certain customer into a queue. Respective queues may be identified with a person, such as a customer service representative. Messages 101 in the queues may be handled based on a fixed criteria, such as on a first come first serve basis or based on the presumed importance or value of a customer.

Handling messages 101 based on a single criteria, such as monthly expenditures with the corporation, may cause some high priority messages, such as a message about a stolen credit card, to be responded to according to standard criteria, such as a customer's expenditures with the corporation, instead of according to particular information in the message, such as use of the word "stolen" or "theft," in the body of message 101.

Implementations of the invention may use a message classifier 120 to search across queues in message handling system 110 for messages 101 that contain information indicating that the message should be handled in a certain way, such as by taking a message 101 out of a queue and sending it directly to operator 130, where message 101 can be answered out of turn.

Implementations of message classifier 120 may operate with a given category, such as payments 102, account status 104, or login issues 106. For example, message classifier 120 may search across queues for messages 101 pertaining to a particular category, such as account status 104. Message classifier 120 may employ text or speech recognition techniques to identify words or groups of words contained in message 101 that pertain to a desired category. For example, message classifier 120 may scan all messages in the queues of message handling system 110 and may produce a score for each message 101, where a score for a message 101 is based on the occurrence of certain words in message 101. For example, if message classifier 120 is attempting to locate messages dealing with account status 104, words and phrases such as "status," "inquiry," "what is my account status," "status update," etc., may be identified in message 101.

Message classifier 120 may compare identified words in a message 101 to the content of stored messages that were previously received and previously classified by system 100. The previously classified messages may already be identified with one or more categories, such as payments 102, account status 104, or login issues 106. Scores may be generated for each identified word in message 101 based on the comparison with words contained in the stored messages. Scores for each word in message 101 may be combined to produce an aggregate score with respect to a given category for message 101.

Message classifier 120 may compare each of the aggregate scores to determine which category most accurately corresponds to the content of the message. Message classifier 120 may then associate message 101 with the highest scoring category based on the aggregate score of message 101 with respect to that category, as calculated by probabilistic scoring of the content of message 101 with the content of previously stored messages.

Message classifier 120 may further store text that was used to answer stored messages. For example, a stored message in message classifier 120 may be identified with an aggregate score, a category, and text that was used to answer a question contained in the stored message. For example, operator 130 may have previously typed an answer to a question contained in a previous message (that is now the stored message) that was processed by message classifier 120. Operator 130 may have provided the answer to a sender of the previous message via a reply message. A "sender" or "user" is intended to refer to a client device, such as a personal computer operated by a customer of the corporation. The sender or user may be identified with an identifier of a person, such as the person's name, social security number, account number, etc.

Message classifier 120 may group the answer with the stored message containing the sender's question and may store the message and answer in a database so that the answer to the previous message can be used to help answer an incoming message (message 101) when an activation rate for the incoming message meets or exceeds an activation threshold determined by the set of previous messages associated with the answer.

Implementations of system 100 can be configured to auto respond to messages 101. For example, system 100 can auto respond by having message classifier 120 generate a reply, retrieve an answer associated with a category grouping of stored message for which the score of message 101 meets or exceeds the activation threshold, and insert the retrieved answer into the reply. Message classifier 120 may further be configured to group messages 101 having similar scores together so that similar messages can be answered via bulk replies (i.e., a reply sent to several senders at once, such as senders of the messages that were grouped together).

Exemplary Network

Figure 2:
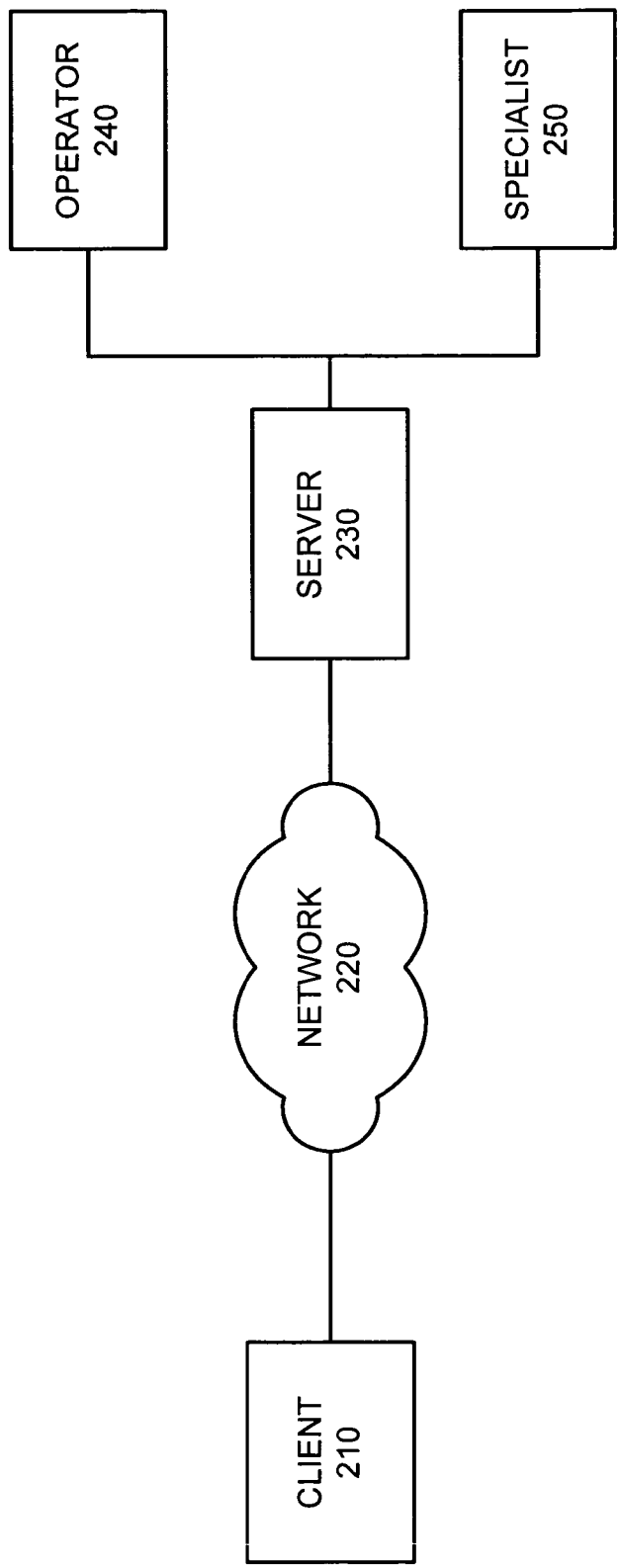
FIG. 2 is a diagram of an exemplary network in which systems and methods consistent with principles of the invention may be implemented.

FIG. 2 is a diagram of an exemplary network in which systems and methods consistent with principles of the invention may be implemented. The implementation of FIG. 2 may include client 210, network 220, server 230, operator 240 and specialist 250.

Implementations disclosed herein may operate on incoming messages, such as email, voicemail, web-based forms, text and/or voice from on-line chat applications, etc. "Incoming message," as used herein, refers to a current message being processed by an implementation consistent with the principles of the invention. Messages stored on server 230 are herein referred to as "prior messages" or "stored messages." Prior messages may represent previously received messages, e.g., messages that were previously incoming/current messages. For example, a first incoming message may be received, processed, and stored by server 230. Next, a second incoming message may be received by server 230. The first incoming message may be a prior message with respect to the second incoming message. "Sender," as used herein, refers to any device capable of sending data, such as a packet or any other type of data unit, to a destination. A "sender" may be operated by a user, such as a customer, and may be associated with the user and/or an identity of the user, such as a social security number, account number, user ID, etc.

Client 210 may include a device configured to send data to a network and/or to receive data from a network. Client 210 may be identified with a person, such as a user. For example, client 910 may represent a subscriber of communication services provided by server 230 and/or client 210 may represent a customer of a company, such as a software company, that operates server 230. In one implementation, client 210 may operate as a sender and may send one or more incoming messages to server 230.

Client 210 may include a desktop computer, a laptop computer, a personal digital assistant (PDA), a web enabled cellular telephone, a wireless fidelity (Wi-Fi) device, or another type of application specific processing device that is operated by a user to communicate with a destination device, such as server 230. Client 210 may also include a plain old telephone system (POTS) device, a cellular telephone, etc. that may be connected to network 220 via a voice gateway (not shown). Client 210 may communicate with other devices, such as other clients, servers, or network devices, such as routers, gateways, switches, etc. consistent with principles of the invention.

Network 220 may include a network, or combination of networks, capable of transporting analog or digital data. For example, an analog implementation of network 220 may carry non-digitized speech data and a digital implementation of network 220 may include a local area network (LAN), a metropolitan network (MAN), or a wide area network (WAN), such as the Internet, carrying packet or non-packet data. Network 220 may operate using substantially any protocol, such as, for example, asynchronous transfer mode (ATM), synchronous optical transport (SONET), Internet Protocol (IP), public switched telephone network (PSTN), or Bluetooth.

Network 220 may include network devices, such as voice gateways, routers, switches, firewalls, and/or servers (not shown). Network 220 may be a hardwired network using wired conductors, such as shielded twisted pairs, coaxial cables, optical fibers, and/or waveguides. Network 220 may also be a wireless network using free-space optical, radio frequency (RF), and/or acoustic links. Implementations of networks and/or devices described herein are not limited to any particular data format, type, and/or protocol.

Server 230 may include a device capable of receiving data from or transmitting data to another device and/or network. For example, server 230 may include a workstation, desktop computer, laptop computer, PDA, web enabled cellular telephone, Wi-Fi device, or another type of device. In exemplary implementations described herein, server 230 may operate as a destination device by receiving one or more messages from client 210. For example, server 230 may provide a service, such as customer support services, to other devices on network 220, such as client 210.

Operator 240 and specialist 250 may include any device capable of receiving data from or transmitting data to another device and/or network. For example, operator 240 or specialist 250 may include a desktop computer, a work station or a laptop, a web enabled cellular telephone, a PDA, and/or an IP telephone adapted to receive information, such as incoming messages, from server 230. Operator 240 may be identified with a customer service or help desk representative that is assigned to respond to incoming messages, such as incoming messages in a queue of a message handling application operating on server 230. Specialist 250 may be identified with a person that is assigned to handle certain types of incoming messages. For example, a person, working at specialist 250 may work on incoming messages pertaining to certain topics, incoming messages having certain priorities, etc. Operator 240 and specialist 250 may be able to exchange information, such as incoming messages, between each other.

Implementations consistent with the principles of the invention may include substantially any number of clients 210, networks 220, servers 230, operators 240 or specialists 250.

Exemplary Client or Server

Figure 3:
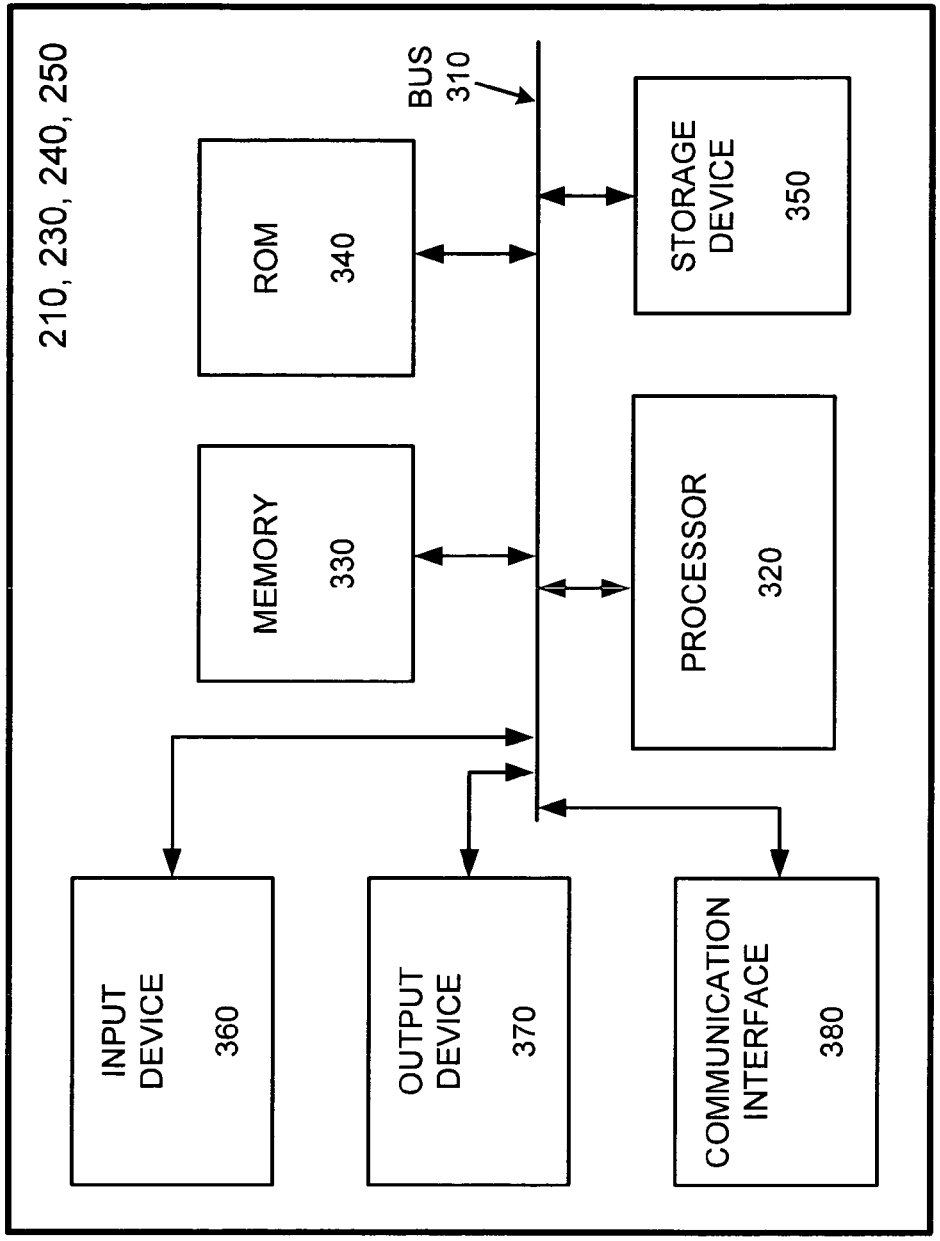
FIG. 3 is a diagram of an exemplary client or server of FIG. 2.

FIG. 3 is an exemplary diagram of a client or server entity (hereinafter called "client/server entity"). A client/server entity may correspond to one or more of client 210, server 230, operator 240 or specialist 250 of FIG. 2. The client/server entity may include a bus 310, a processor 320, a main memory 330, a read only memory (ROM) 340, a storage device 350, an input device 360, an output device 370, and a communication interface 380. Bus 310 may include a path that permits communication among the elements of the client/server entity.

Processor 320 may include a processor, microprocessor, or processing logic that may interpret and execute instructions. Main memory 330 may include a random access memory (RAM) or another type of dynamic storage device that may store information and instructions for execution by processor 320. ROM 340 may include a ROM device or another type of static storage device that may store static information and instructions for use by processor 320. Storage device 350 may include a magnetic and/or optical recording medium and its corresponding drive.

Input device 360 may include logic that permits an operator to input information to the client/server entity, such as a keyboard, a mouse, a pen, voice recognition and/or biometric logic, etc. Output device 370 may include a mechanism that outputs information to the operator, including a display, a printer, a speaker, etc. Communication interface 380 may include any transceiver-like mechanism that enables the client/server entity to communicate with other devices and/or systems. For example, communication interface 380 may include mechanisms for communicating with another device or system via a network, such as network 230.

As will be described in detail below, the client/server entity, consistent with the principles of the invention, may perform certain message processing and classification functions. The client/server entity may perform these operations in response to processor 320 executing software instructions contained in a computer-readable medium, such as memory 330. A computer-readable medium may be defined as a physical or logical memory device and/or carrier wave.

Software instructions may be read into memory 330 from another computer-readable medium, such as data storage device 350, or from another device via communication interface 380. The software instructions contained in memory 330 may cause processor 320 to perform processes that will be described later. Alternatively, hardwired circuitry may be used in place of or in combination with software instructions to implement processes consistent with principles of the invention. Thus, implementations consistent with principles of the invention are not limited to any specific combination of hardware circuitry and/or software.

Exemplary Server Functional Diagram

Figure 4:
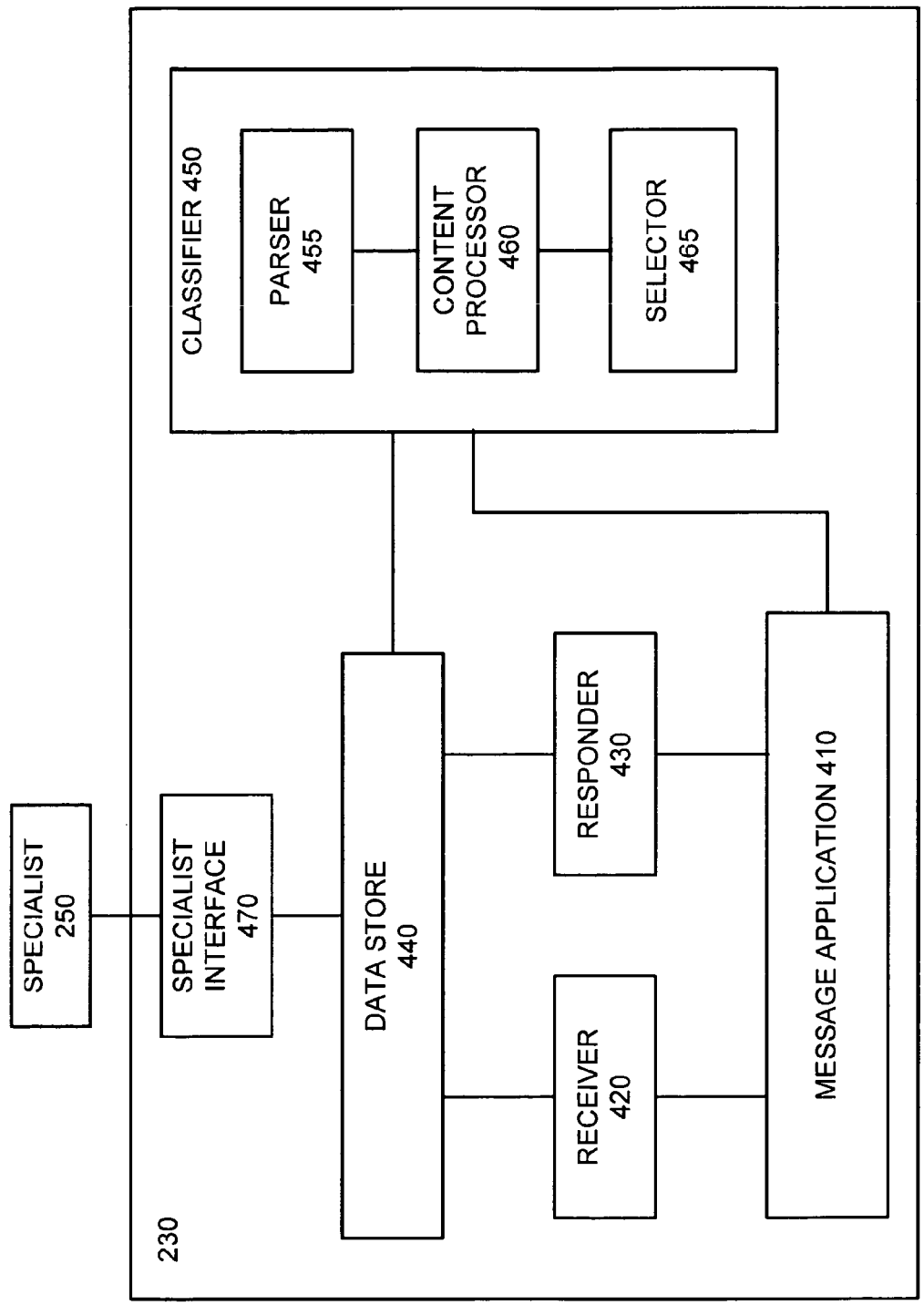
FIG. 4 is a functional diagram of an exemplary server consistent with the principles of the invention.

FIG. 4 is a functional diagram of an exemplary server that may be used to implement content-based classification consistent with principles of the invention. Server 230 may include message application 410, receiver 420, responder 430, data store 440, classifier 450, and specialist interface 470. Classifier 450 may include a parser 455, a content processor 460, and a selector 465.

Message application 410 may receive and route incoming messages. For example, message application 410 may receive incoming messages via network 220 and may execute a routing script to route messages to certain destinations, such as queues (not shown) and/or receiver 420. Message application 410 may uses queues to group messages using criteria, such as fixed criteria, so that messages in a given queue can be directed to a resource, such as an operator 240. Message application 410 may further send reply messages received from responder 430 to a destination, such as client 210.

Receiver 420 may receive incoming messages from another device or application. For example, receiver 420 may remove incoming messages from queues operating with message application 410 and may transmit removed messages to data store 440. Alternatively, receiver 420 may make copies of incoming messages in queues of message application 410 and may send message copies to data store 440 without removing incoming messages from the queues.

Responder 430 may transmit a message to another device or application. For example, responder 430 may send a reply message generated by specialist 250 to message application 410. Responder 430 may also return an incoming message from data store 440 to message application 410 when a determination is made that an incoming message should not be processed by classifier 450.

Data store 440 may store messages and information about messages. For example, data store 440 may store incoming messages and information pertaining to incoming messages, such as a score for an incoming message. Data store 440 may further store prior messages and information related to prior messages, such as categories that are related to content in the prior messages, scores for the prior messages, and/or answers that were used to respond to the prior messages by a device, such as specialist 250.

Classifier 450 may implement classification techniques, such as Bayesian classification techniques, to classify incoming messages and to recommend answers for incoming messages using answers related to prior messages contained in data store 440. A Bayesian classification application may become better at classifying incoming messages as the number of prior messages increases. The Bayesian classification application may perform better classifications over time because the likelihood that the content of an incoming message is a close match to the content of prior categorized messages increases as the number of prior accurately categorized messages increases. In this way, classifier 450 continually becomes better at classifying incoming messages over time because the likelihood that probabilistic similarity exists between an incoming message and a prior message increases as the number of prior accurately categorized messages increases.

Classifier 450 may relate incoming messages to a category based on content in the incoming message. In one implementation, classifier 450 may compare content of an incoming message to content related to a number of stored messages. Classifier 450 may produce a result based on terms in a message, such as an incoming message. Terms in a message may include key terms and non-key terms. Key terms and non-key terms may refer to information in a message that classifier 450 is attempting to identify. A key term may include a word or group of words that are related to a category and that may be indicators, e.g., a strong indicator, of the content of a message. For example, if a category is "accounts," key terms related to accounts may include words like "credit card," "payment," "balance," etc. In contrast, non-key terms may include words that are not strong indicators of the content of a message, such as "the," "and," "or," "a," etc. Classifier 450 may produce a result by comparing key terms in an incoming message to key terms in prior messages. A result produced by classifier 450 may be representative of the occurrence of certain information, such as particular words or groupings of words, within a message.

Classifier 450 may be integral to server 230 or may be modular so that classifier 450 may be moved from one host to another. Classifier 450 may be implemented in hardware based logic, software based logic, and/or hybrid logic that includes both hardware and software based logic. In one implementation, classifier 450 may use parser 455, content processor 460, and selector 465 to identify and classify key terms contained in messages received from message application 410 via data store 440. Aspects of classifier 450 are described in a co-pending, commonly assigned, patent application entitled "INTELLIGENT TICKET PROCESSING," filed on Mar. 31, 2006, having application Ser. No. 11/394, 198, the contents of which are herein incorporated by reference in their entirety.

Parser 455 may parse content from an incoming message into one or more portions. For example, parser 455 may parse content into key term portions and non-key term portions. A key term portion may include key terms that are identified with a category, directly or indirectly. The key term portion may include words/phrases that are related to a single category and/or to multiple categories. In contrast, a non-key term portion may include content that is not identified with a category. For example, non-key term portion may include common words that may not be very useful for identifying an incoming message with one or more categories.

Content processor 460 may produce a result, such as a probability value, based on the contents of a message. For example, content processor 460 may receive a key term for an incoming message from parser 455 and may compare the key term with the contents of a number of prior messages stored in data store 440. Content processor 460 may produce a result based on the comparison.

In one implementation, content processor 460 may determine a result, such as an activation rate, for an incoming message based on relative Bayesian probabilities of the incoming message with respect to possible categories, such as categories identified with the prior messages. For example, prior messages stored in data store 440 may represent a defined corpus of text that can be analyzed for key terms that appear in the text of the prior messages. The occurrence of the key terms in the prior messages can be compared against key terms occurring in an incoming message. Probabilities for key terms in the incoming message may be determined with respect to key terms (keywords) from the prior messages.

Content processor 460 may produce an activation rate based on probabilities determined for the incoming message. In one implementation, the activation rate may represent a total score for the incoming message. For example, content processor 460 may determine a probability for each key term that is identified within an incoming message by comparing each key term to the content of prior messages stored in data store 440. Content processor 460 may compound probabilities for identified key terms, present in the incoming message, to produce an overall, or aggregate, probability for the incoming message with respect to each possible response categorization. The overall probability for an incoming message may represent the activation rate for the incoming message.

Content processor 460 may pass a normalized activation rate or an un-normalized activation rate to selector 465. For example, content processor 460 may produce a normalized activation rate having a range of 0 to 100 based on the presence of key terms in a message. Assume that content processor 460 is looking for the phrase "my credit card number" within incoming messages. For this message, key terms may include "credit card" and "number" and non-key terms may include "my." Further assume that a first message does not include any of the key terms, a second message includes "credit card" and a third message includes "credit card" and "number." Content processor 460 may produce a normalized activation rate of 0 for the first message, 50 for the second message and 100 for the third message. In contrast, an un-normalized activation rate may include raw activation rates for one or more key terms identified within an incoming message.

Selector 465 may select a prior message and/or information related to a prior message based on an activation rate for an incoming message. For example, selector 465 may select a prior message having an activation rate that closely matches an activation rate for an incoming message. Selector 465 may also select a category that is related to the prior message and may associate the selected category with the incoming message. Selector 465 may further select an answer that was used to respond to the prior message. Selector 465 may group the selected answer with the incoming message so that the selected answer may be used in a response to the incoming message. Selector 465 may further send selected information (e.g., selected answers) to a destination, such as specialist interface 470, specialist 250, or another destination, such as client 210, along with the incoming message. A destination, such as specialist 250, may use the selected information when composing a reply message to the incoming message.

Selector 465 may use other information, such as parameters and/or variables, received from devices or components operating in server 230 or connected to server 230 via network 220, when selecting a prior message, a category, or an answer. For example, selector 465 may receive an activation rate from content processor 460, customer account information from an accounting application, network information (e.g., information about a network malfunction) from a network device, etc. Selector 465 may use this received information when selecting an answer for use with an incoming message.

Specialist interface 470 may receive information from and may send information to data store 440, classifier 450, or other components of server 230. For example, specialist interface 470 may receive an incoming message from data store 440 or classifier 450 along with recommended answers for prior messages having activation rates similar to an activation rate for the incoming message. Specialist interface 470 may forward the incoming message and recommended answers to specialist 250. Specialist interface 470 may receive a reply from specialist 250 and may forward the reply to data store 440 or responder 430.

Figure 5:
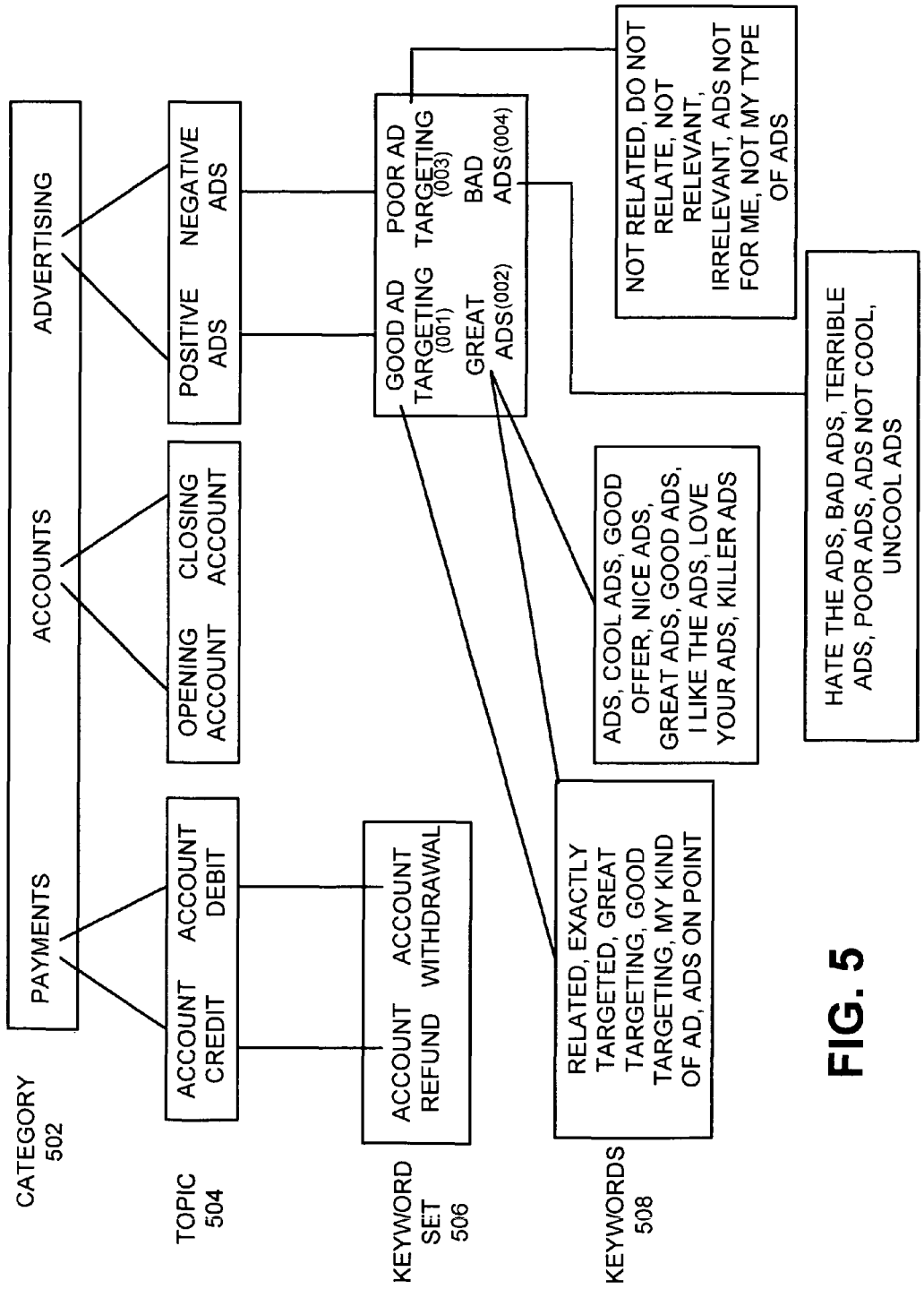
FIG. 5 is a diagram illustrating relationships between categories, topics, keyword sets, and keywords consistent with principles of the invention.

Exemplary Relationships Between Categories, Topics, Keyword Sets and Keywords FIG. 5 is a block diagram that illustrates an exemplary relationship between categories, topics, keyword sets and keywords. Implementations of classifier 450 may operate using a hierarchy of categories that can be used to organize information of interest in a way that promotes efficient operation of server 230 when performing content-based classification of incoming messages. For example, classifier 450 may operate with a data structure that correlates activation rates for incoming messages and/or prior messages with categories in the hierarchy. In one implementation, this hierarchy may be category-based, and may have a category as the topmost layer, or tier, in the hierarchy.

Category 502 may be used to identify and/or classify content in one or more incoming messages or prior messages. An incoming message or prior message may include information pertaining to more than one category 502. For example, in one implementation, the types of categories 502 may be "payments," "accounts," "advertising," etc., and these categories 502 may have multiple incoming messages associated therewith. Multiple incoming messages may be identified with a category 502 because activation rates for the multiple incoming messages may meet or exceed a threshold activation score associated with one of categories 502. Categories 502 may include topics 504, keyword sets 506 and keywords 508 that operate to further refine and organize information included within category 502. For example, payments category 502 may include topics 504, keyword sets 506, and keywords 508 that pertain to payment related issues, such as late payments, determining if a payment was received, determining if a payment was made in a proper currency, etc.

Topic 504 may be located below category 502 and may operate to further refine categories of information related to categories 502, such as payments, accounts, advertising, etc. In one implementation, topic 504 for payments category 502 may include "account credit" and "account debit" and topic 504 for advertising category 502 may include "positive ads" and "negative ads." "Account credit" may pertain to information for crediting sums to a customer's account, such as an account for an individual, an institution, or a corporation. In contrast, "account debit" may pertain to information for debiting sums from a customer's account. "Advertising" may include "positive ads" that may pertain to information for customers' feedback that expresses favorable opinions with respect to advertising provided by an entity, such as a company operating server 230. "Advertising" may further include "negative ads" topic 504 that can include information expressing customers' unfavorable opinions about advertising that is affiliated with the company.

Keyword set 506 may be located below topic 504 and may operate to further refine categories for information related to topics 504, such as account credit, account debit, opening an account, closing an account, positive ads, or negative ads. Keyword set 506 may identify groupings of keywords 508 that can appear within an incoming message. For example, "positive ads" topic 504 may include "good ad targeting" and "great ads" keyword set 506 and "negative ads" topic 504 may include "poor ad targeting" and "bad ads" keyword set 506. Keyword set 506 may include substantially any number of keywords 508 consistent with the principles of the invention. Moreover, keyword set 506 may include keywords 508 in a single language, such as English, or may include keywords 508 from multiple languages.

Keywords 508 may be located below keyword set 506 and may identify words that may operate as key terms within an incoming message. Classifier 450 may search for and identify words, such as key terms, in an incoming message that match one or more keywords 508. Activation rates produced by classifier 450 may identify the presence and relative importance of words that match keywords 508 within an incoming message. An incoming message or prior message may include keywords 508 that fall within one or more categories 502.

The occurrence of keywords 508 in a message may cause classifier 450 to compute relative probabilities, e.g., activation rates based on the presence of keywords 508 in the message. The activation rate for keywords 508 may be used to determine if keywords 508 belong to a higher level category 502. For example, a determination may be made as to whether keywords 508 in an incoming message belongs to a particular keyword set 506, whether keyword set 506 belongs to a topic 504, and whether a topic 504 belongs to one or more categories 502. For example, classifier 450 may compound probabilities of each keyword together to arrive at a probability for an incoming message. A probability for the incoming message may be used to identify one or more categories 502 into which the incoming message should be placed for processing via specialist 250.

First Exemplary Data Structure

FIG. 6 is an exemplary data structure 600 that may store information related to a category 502 consistent with the principles of the invention. Data structure 600 may include category ID 610, topic 504, keyword set ID 620, and keywords 508. Information in data structure 600 may be arranged in a row by column format to facilitate interpretation by an operator and may be organized to include a number of entries 650-680.

Category ID 610 may include information that identifies a category 502 related to other information included in data structure 600, such as keyword set ID 620, topic 504 and keywords 508. For example, category ID 610 may include categories 502, such as payments, accounts, advertising, etc., consistent with principles of the invention. Implementations of data structure 600 may include information for a single category 502 or multiple categories 502.

Topic 504 may include information that identifies one or more topics containing keywords 508. Keyword set ID 620 may include information that identifies a keyword set 506 that contains keywords 508 for an entry 650-680. Keyword set ID 620 may include an identifier that identifies a particular keyword set 506 and may include numbers and/or letters. For example, keyword set ID 620 may include a number that uniquely identifies one of a number of keyword sets 506 related to a category 502 identified by category ID 610. A keyword set ID 620 may be used with one or more topics 504. For example, keyword set ID 620 having number 001 may be associated with "good ad targeting" in entry 660 and with "great ads" in entry 680. Keywords 508 may include one or more key terms that are contained in a keyword set 506 identified by keyword set ID 620.

Second Exemplary Data Structure

FIG. 7 is an exemplary data structure 700 that may be used to store information associated with incoming messages consistent with principles of the invention. Data structure 700 may be used to store information related to an incoming message, such as a category 502, activation rates, and/or information about decisions made with respect to an incoming message. An implementation of data structure 700 may include sender ID 710, message ID 720, category 502, topic 504, keyword set ID 620, score 730 and threshold status 740.

Sender ID 710 may identify a sender of an incoming message. For example, sender ID 710 may include an email address, telephone number, customer number, customer name, or other information that can be used to identify a sender of an incoming message. Message ID 720 may be an identifier assigned to an incoming message by server 230 to further identify an incoming message. For example, message ID 720 may be used to identify and/or order incoming messages within data store 440, classifier 450, or specialist 250.

Category 502 may identify a category that has been assigned to an incoming message based on an activation rate for the incoming message. Topic 504 may identify a topic that is included within category 502. Keyword set ID 620 may identify a keyword set 506 that was used to produce the activation rate for the incoming message. Score 730 may identify a score assigned to an incoming message by classifier 450. For example, score 730 may represent a normalized activation rate based on keywords 508 contained in an incoming message. Threshold status 740 may include information that identifies whether an incoming message exceeded a predetermined threshold value. Assume entry 750 may have to exceed a threshold of 80% to cause an incoming message from Mary Smith to be forwarded to specialist 250 or another destination. Since score 730 is 75% for entry 750, threshold status 740 is populated with "not exceeded" to indicate that the incoming message from Mary Smith will not be passed to specialist 250. Threshold status 740 may be used with fixed thresholds or variable thresholds. Variable thresholds may be raised to allow fewer incoming messages to exceed a threshold value or may be lowered to allow more incoming messages to exceed the threshold value.

Exemplary Method

Figure 8A:
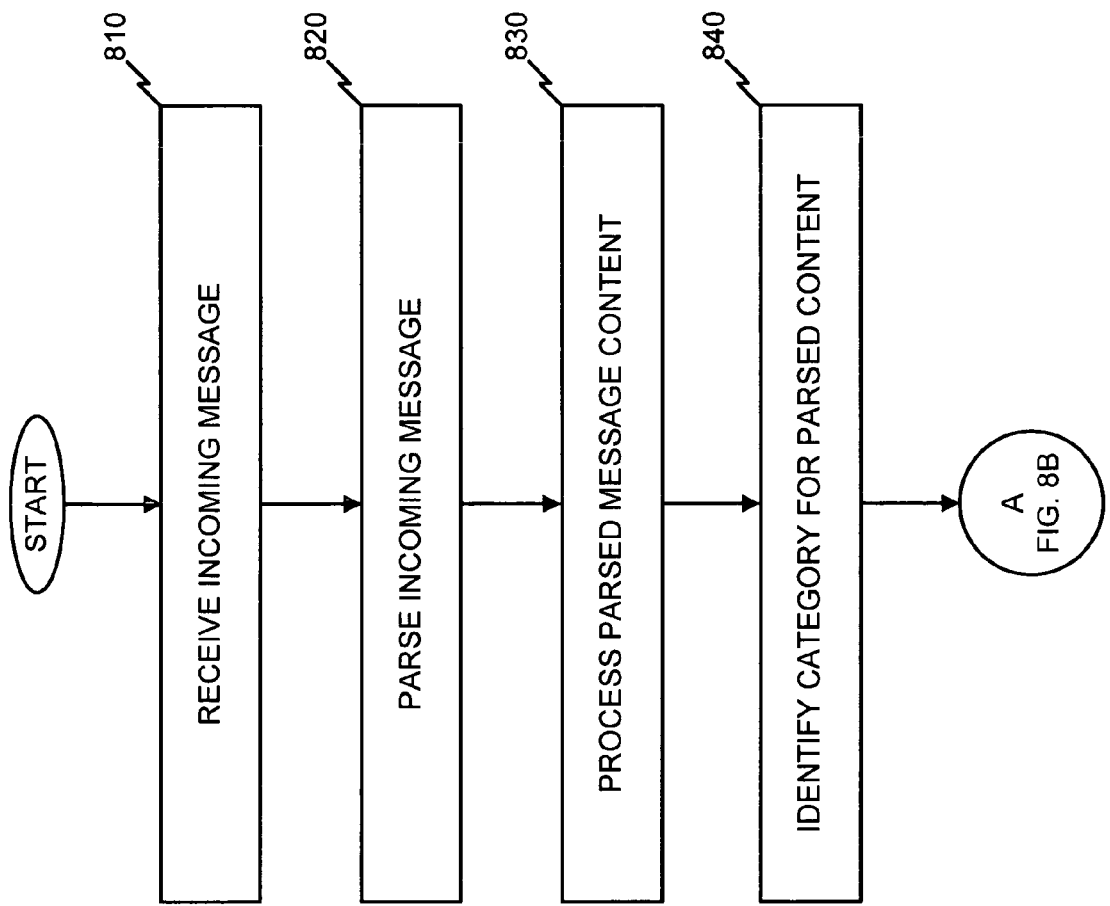

FIGS. 8A and 8B illustrate an exemplary method for processing incoming messages using content-based classification, consistent with the principles of the invention, that may be implemented by server 230. Classifier 450 of server 230 may operate with a number of applications, such as a message processing application, a web based search engine, or an advertising application that targets ads to web users based on words used in search strings for web based content, etc. Therefore, server 230 may implement a version of classifier 450 that can be used in conjunction with several types of applications to process substantially any type of incoming message.

An incoming message may be received at server 230 (block 810) (FIG. 8A). For example, message application 410 may receive the incoming message from network 220. The incoming message may be an email message, a voicemail message, a facsimile transmission, content from a web-based form, voice from an on-line chat session, text from an on-line chat session, etc. A script executing in message application 410 may label the incoming message as belonging to one or more queues. For example, the script may assign incoming messages to queues based on an identity of a sender or an amount of money that the sender spends with an owner of server 230 on a monthly basis.

Receiver 420 may copy a subset of the incoming messages from the queues and may place the copied messages into data store 440. Data store 440 may store a number of incoming messages and a number of prior messages that can be used to process incoming messages. Incoming messages may include messages awaiting processing by classifier 450 and prior messages may include messages that have previously been classified by classifier 450 and/or processed by specialist 250.

Classifier 450 may process an incoming message to determine if the message includes certain content. For example, classifier 450 may determine if words in the incoming message match words associated with one or more categories. Classifier 450 may determine if words in the incoming message are included in a category by comparing words in the incoming message with words included in the prior messages. Since prior messages may have already been classified using one or more categories (e.g., stored prior messages may have been assigned to a category by an operator), words in the incoming message can be related to a category 502 using the prior messages.

Classifier 450 may use parser 455 to parse content in an incoming message (block 820). Parser 455 may parse content in the incoming message into key term portions and non-key term portions. Assume, for example, that an incoming message includes "Great ads, just what I need. In fact, you have killer ads." Parser 455 may parse the content into non-key terms that may include "just," "what," "I," "need," "in," "fact," "you," and "have." Parser 455 may parse the incoming content into key term portions "ads," "great ads" and "killer ads." The key terms may be useful for relating the content of the incoming message with one or more categories 502, whereas non-key terms may not be useful for relating incoming message content to prior message content or categories 502. Key terms may correspond to keywords 508 that are included in a category hierarchy, such as the category hierarchy illustrated in FIG. 5.

Content processor 460 may process parsed message content received from parser 455 (block 830). For example, content processor 460 operate on key terms received from parser 455 to produce probabilities for key terms in the incoming message using keywords 508 in prior messages stored in data store 440. Content processor 460 may attempt to match key terms in the incoming message with a category and/or keywords identified with a data structure, such as data structure 600. For example, content processor 460 may compute a probability that a key term in the incoming message is included in keyword set 506, topic 504 and/or category 502, where key terms in keyword set 506, topic 504, or category 502 may appear in one or more of the stored prior messages. Content processor 460 may compute probabilities for key terms contained in the incoming message using keywords 508 included in keyword set 506, such as good ad targeting, great ads, poor ad targeting, and bad ads (FIG. 5). Since key terms contained in the incoming message most closely match the keywords 508 in the great ads keyword sets 506 (FIG. 5), probabilities computed for key terms contained in the incoming message using keywords 508 included in great ads keyword set 506, such as "great ads," "ads," and "killer ads," may produce the highest probabilities, or scores.

Content processor 460 may identify a category 502 for parsed message content (block 840). Content processor 460 may compound probabilities for key terms included in the incoming message to arrive at a probability, or activation rate, for the content of the incoming message with respect to each possible reference categorization (e.g. categories 502, such as payments, accounts, or advertising). Content processor 460 may identify one or more categories for the incoming message based on criteria, such as a category 502 having an activation rate that is met or exceeded by an activation rate related to the content of the incoming message.

Assume, for example, that normalized activation rates are associated with categories 502, i.e., payments, accounts and advertising. Further assume, for example, that a category 502 having a highest activation rate based on the content of the incoming message will be identified as the category into which the incoming message should be grouped. For example, if an incoming message has an activation rate of 22% for payments, 13% for accounts, and 95% for advertising, content processor 460 may determine that advertising is the appropriate category 502 to identify with the incoming message, assuming 95% exceeds the activation threshold for the 'advertising' category.

Implementations may employ activation rate thresholds to determine how incoming messages are handled, such as for determining whether an incoming message is forwarded to specialist 250. For example, one implementation may employ a fixed activation rate threshold, e.g., where payments, accounts and advertising all have the same activation rate threshold, e.g., 25%. Alternatively, implementations may employ variable activation rate thresholds, e.g., where payments has an activation rate threshold of 25%, accounts has an activation rate threshold of 40%, and advertising has an activation rate threshold of 60%. Variable activation rate thresholds may also be implemented by having a category, e.g. advertising, have a first threshold for a first incoming message and a second threshold for a second incoming message. In one implementation, data structure 700 may be used to store information about activation rate thresholds.

Incoming messages may be forwarded to a destination, such as specialist 250, or processed in a certain way, such as by sending a bulk reply in response to multiple similar incoming messages, when activation rates for the incoming message exceed an activation rate threshold for one or more categories 502. For example, when an incoming message has an activation rate of 27% for payments and 45% for accounts, categories 502 of payments and accounts may be identified with the incoming message when an activation rate thresholds for payments and accounts is below 27% and 45%, respectively, such as 25% for payments and 40% for accounts.

Selector 465 may select one or more answers related to one or more prior messages based on an activation rate for an incoming message (block 850)(FIG. 8B). For example, an incoming message may be identified with a first prior message and a second prior message based on a similarity between an activation rate for the incoming message and activation rates for the prior messages. Selector 465 may further select answers based on categories 502 that are related to the incoming message and/or prior messages.

Selector 465 may send an answer related to one or more prior messages to a destination (block 860). For example, when the incoming message is identified with the first and second prior messages, selector 465 may copy answers that are related to the first and second prior messages, and selector 465 may use the selected answers to formulate a reply to the incoming message. In one implementation, selector 465 may generate a reply that is compatible with a format of the incoming message. For example, if an incoming message is an email message, selector 465 may generate a reply email message. In a second implementation, selector 465 may generate a reply that differs in format from a format of the incoming message. Assume, for example, that an incoming message is an email message. Selector 465 may generate a reply that is a voice-mail message, a facsimile transmission, a web-based document, etc. Selector 465 may forward the reply message to responder 430 and responder 430 may provide the reply message to message application 410. Message application 410 may send the reply message to a destination, such as a sender of the incoming email.

Selector 465 may forward answers, the incoming message, and/or category information related to the incoming message to a device, such as specialist 250. For example, selector 465 may provide one or more recommended answers and the content of the incoming message to a display device of specialist 250. An operator of specialist 250 may generate a reply to the incoming message using the answers, such as by inserting the answers into the reply message. Specialist 250 may send the reply message to a destination, such as a sender of the incoming message, in a format similar to the format of the incoming message or in a different format.

Classifier 450 may be updated based on processing performed on an incoming message (block 870). For example, when a reply is generated by selector 465, a copy of the incoming message and reply message may be stored with the prior messages for use in processing subsequent incoming messages. In one implementation, message application 410 may send a copy of the reply message to classifier 450 so that classifier 450 can update data store 440. Classifier 450 may also accept additional classification information from a device, such as specialist 250, and may use the additional information to further refine classifications made on behalf of incoming messages. The use of additional classification information, such as codes, when generating a reply message, may help correlate a category 502 or topic 504 for an incoming message with an answer. Correlating the incoming category 502 or topic 504 with an answer may allow data store 440 to be updated with content known to be correct. Since a properly classified reply message may be considered part of the prior message database for subsequent incoming messages, classifier 450 may become more intelligent over time since the number of classified prior messages is always increasing. In addition, the range of classifiable categories 502 may increase over time as the number of classified incoming messages increases. As a result, implementations may employ a greater number of categories 502 as the number of classified prior messages increases. Using a greater number of categories 502 may provide greater category granularity with respect to classifying incoming messages.

Exemplary Processing Flow

Figure 9A:
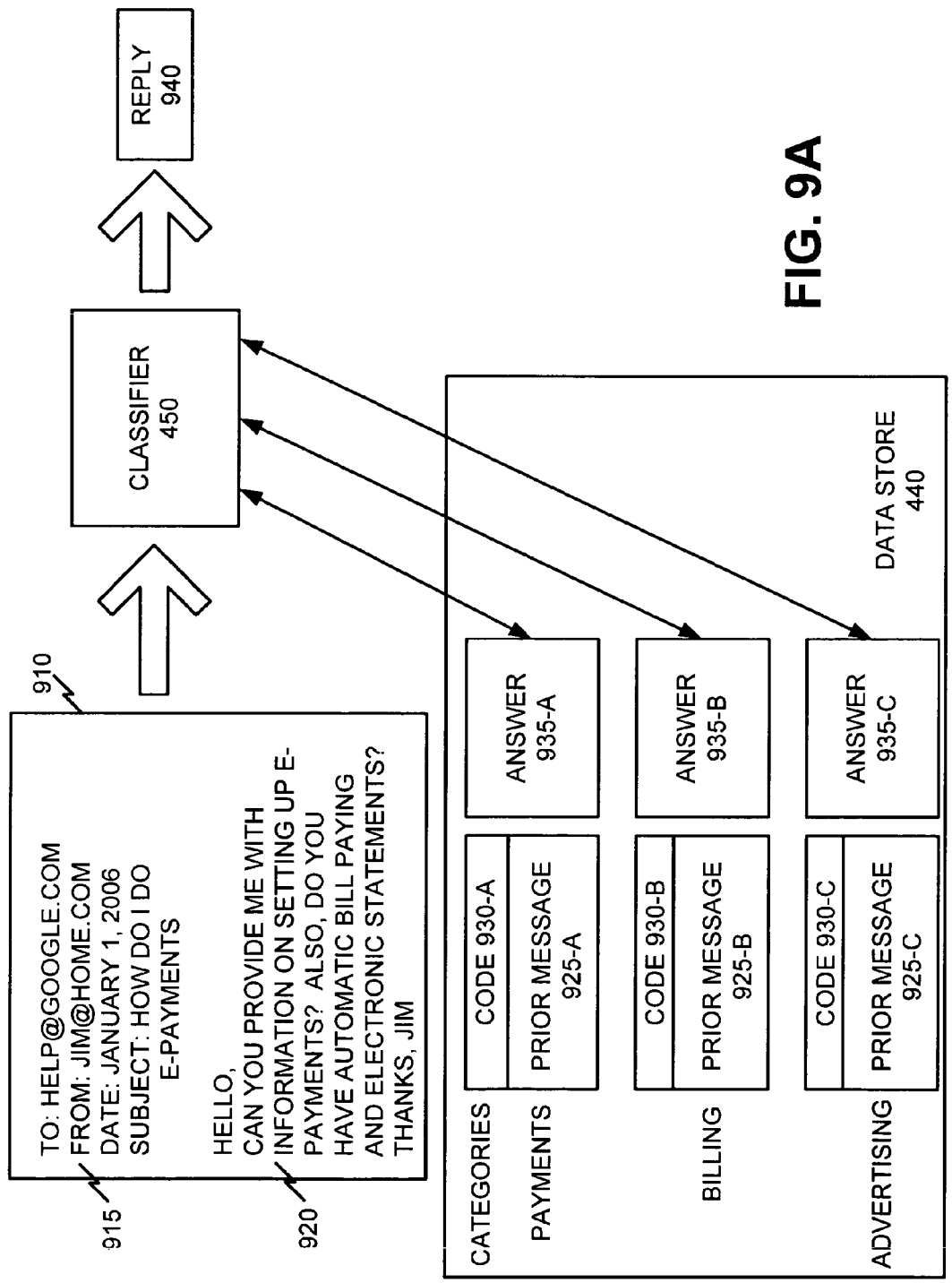

FIGS. 9A and 9B illustrate exemplary processing flow for classifying and replying to an incoming message consistent with principles of the invention. As depicted, FIGS. 9A and 9B include an email message as the incoming message and as the reply message; however, other implementations may use other types of incoming messages and/or reply messages without departing from the spirit of the invention.

FIG. 9A illustrates processing operations performed on the incoming message. Server 230 may receive incoming message 910 from client 210. Incoming message 910 may include a header portion 915 that includes information identifying a sender of the incoming message, and incoming message 910 may include a body portion 920 that includes content that will processed by classifier 450.

Server 230 may include data store 440 that may include a number of prior messages 925-A, 925-B, and 925-C. Each prior message may have been previously classified by classifier 450 and/or another device, such as specialist 250 operated by an operator. Prior messages 925A-C may each have a code, category and answer associated therewith. For example, codes 930-A, 930-B, and 930-C may represent classification codes assigned to respective prior messages 925A-C by an operator of specialist 250 and/or classifier 250. Codes 930A-C may relate prior messages to categories, such as categories 502.

One or more categories may be associated with each prior message 925A-C and may serve to group prior messages based on the content of the prior messages. For example, prior message 925-A may be assigned to a payments category, prior message 925-B may be assigned to a billing category, and prior message 925-C may be assigned to an advertising category.

Each prior message 925A-C may have an answer associated therewith. For example, prior message 925-A may be related to answer 935-A, prior message 925-B may be related to answer 935-B, and prior message 925-C may be related to answer 935-C. Answers 935A-C may be represent content that was used to address questions in prior messages 925A-C, respectively.

Classifier 450 may parse body portion 920 into key terms and non-key terms using parser 455. For example, parser 455 may identify key terms of "E-payments," "automatic bill paying," "bill paying," "electronic statements," and "statements" in message 910. Classifier 450 may use content processor 460 to determine probabilities for key terms in message 910. Content processor 460 may compute probabilities for key terms in message 910 using keywords 508 included in prior messages 925A-C. Content processor 460 may compare each key term to content from each prior message 925A-C. A probability value may be determined for each key term and the probabilities for each key term may be compounded to arrive at an aggregate probability, or activation rate, for message 910. The activation rate for message 910 may relate message 910 to one or more categories that are related to prior messages 925A-C. For example, key term "E-payments" may have been identified with prior message 925-A and the payments category, and key terms "automatic bill paying" and "electronic statements" may be identified with prior message 925-B and the billing category.

Selector 465 may select one or more answers and/or categories based on a result produced by content processor 460. For example, selector 465 may select payments category and answer 935-A and the billing category and answer 935-B. Selector 465 may use the selected answers, 935-A and 935-B, to generate a reply to message 910.

FIG. 9B illustrates an exemplary reply message that can be generated by selector 465 consistent with the principles of the invention. Selector 465 may create reply 940 that may include a header portion 945 that identifies a recipient of reply message 940, such as a sender of message 910. Header portion 945 may further include information about a sender of reply message 940, a date that reply message 940 was generated and/or a subject of reply message 940. Selector 465 may also generate a body portion 950 of reply message 910 that may include the answer content.

Body portion 950 may include an electronic payments portion 955 that may include some or all of the content associated with answer 935-A, a bill paying portion 960 that may include some or all of the content associated with answer 935-B, a request statement portion 965 that may include information generated by specialist 250 and/or an answer from another prior message (not shown in FIG. 9A), and a questionnaire portion 970 that may request information from a recipient of reply message 940.

Reply message 940 may include a code 975 that can be used to further refine classifications performed with respect to incoming message 910. For example, specialist 250 and/or a quality control person may review the content of message 910, a category assigned to message 910 by classifier 450, an answer in reply message 940, a response received from a recipient based on answers to questionnaire portion 970, etc. Specialist 250 and/or the quality control person may modify classifications related to message 910 so that message 910 obtains a more accurate classification that what was originally provided by classifier 450 when message 910 was initially processed on server 230.

A recipient of reply message 940 may answer questions included in questionnaire portion 970 and may send a response to server 230 that includes the recipient's answers. Classifier 450 may use the recipient's response to further refine classifications made with respect to message 910. For example, classifier 450 may modify a category assigned to message 910, a code 975 assigned to message 910, and/or answer content (body portion 950) used to respond to message 910. Classifier 450 may become better at classifying incoming messages with each new incoming message since the number or prior messages (i.e., previous incoming messages) increases over time. Reply message 940 may include a link to a questionnaire in place of questionnaire portion 970. A recipient of reply message 940 may activate the link to provide input to server 230 and/or classifier 450 with respect to reply message 940.

Conclusion

Implementations consistent with principles of the invention may classify messages based on the content of the messages. Bayesian-based classification techniques may be used to classify message content by comparing the content to classified content associated with prior messages. Implementations may become better at classifying an incoming message as the number of classified prior messages increases.

The foregoing description of preferred embodiments of the invention provides illustration and description, but is not intended to be exhaustive or to limit the invention to the precise form disclosed. Modifications and variations are possible in light of the above teachings or may be acquired from practice of the invention.

While a series of acts have been described with regard to FIGS. 8A and 8B, the order of the acts may be modified in other implementations consistent with the principles of the invention. Further, non-dependent acts may be performed in parallel. Acts described in connection with FIGS. 8A and 8B may be performed in sequences that are different than sequences described in connection with FIGS. 8A and 8B. Moreover, certain acts may be omitted from described sequences and other acts may be added to the described sequences without departing from the spirit of the invention.

It will be apparent to one of ordinary skill in the art that aspects of the invention, as described above, may be implemented in many different forms of software, firmware, and hardware in the implementations illustrated in the figures. The actual software code or specialized control hardware used to implement aspects consistent with the principles of the invention is not limiting of the invention. Thus, the operation and behavior of the aspects were described without reference to the specific software code—it being understood that one of ordinary skill in the art would be able to design software and control hardware to implement the aspects based on the description herein.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A system, comprising:
a parser configured to parse a received message to identify one or more terms in the received message; and
a classifier operatively coupled to the parser, wherein the classifier is configured to:
compare the one or more terms parsed from the received message to terms in a plurality of previously received messages, wherein the previously received messages are classified in a data storage as stored classified messages with respect to two or more categories, wherein each category of the two or more categories is within a hierarchy of categories, wherein each level in the hierarchy below a topmost level further refines a category of information that is within an above level, and wherein at least one of the terms in the plurality of previously received messages is associated with at least two categories within the hierarchy of categories;
generate a plurality of scores for the received message based on the comparing, wherein each score of the plurality of scores indicates a probability that the received message is related to a particular category of the two or more categories, wherein a first score of the plurality of scores is associated with a first category of the two or more categories, and wherein a second score of the plurality of scores is associated with a second category of the two or more categories that is different from the first category and that is at a same level within the hierarchy of categories as the first category; and
identify that the received message is associated with the first category based on the first score and the second category based on the second score.

2. The system of claim 1, comprising a responder configured to prepare a particular reply message to a destination, wherein the particular reply message is responsive to the received message and is based on the identified first category and the identified second category and is configured to add a copy of the received message and information in the particular reply message to the classifier, wherein the classifier updates the data storage.

3. The system of claim 1, wherein the classifier is configured to identify the first category using a score of a selected one of the plurality of previously received messages, wherein the selected one of the plurality of previously received messages is related to the first category based on a classification performed on the selected one of the plurality of previously received messages.

4. The system of claim 1, wherein the plurality of scores are generated using Bayesian classification.

5. The system of claim 1, wherein a first reply message has been previously sent to a sender of one of the plurality of previously received messages that is associated with at least one of the first category or the second category.

6. The system of claim 1, wherein the received message includes a particular message, wherein the parser is configured to receive another message, wherein the another message is different from the particular message, wherein the classifier is configured to generate a score for the another message by comparing a term in the another message to the terms in the plurality of previously received messages.

7. The system of claim 6, comprising a selector operatively coupled to the classifier, wherein the selector is configured to:
group the particular message with the another message based on the plurality of scores for the particular message and the score for the another message, and
send a reply message to a sender of the particular message and a sender of the another message based on the grouping.

8. The system of claim 1, comprising a message handler operatively coupled to the parser, wherein the message handler is configured to:
receive a plurality of messages,
identify users associated with one or more of the plurality of messages,
identify a priority associated with a plurality of the identified users, and
output the plurality of messages to the parser in an order that is based on identified priorities of users associated with the messages, wherein the parser is configured to receive and to parse the plurality of messages outputted by the message handler in the order that the messages are outputted by the message handler.

9. The system of claim 1, wherein the order in which the messages are output to the parser is an order that is different from an order in which the message handler receives the messages.

10. The system of claim 1, comprising a message handler operatively coupled to the parser, wherein the message handler is configured to:
receive a plurality of messages in a first order,
identify one or more priority terms associated with one or more of the plurality of messages,
modify, based on the identifying, the first order to obtain a different second order, and
output the plurality of messages to the parser in the second order,
wherein the parser is configured to receive and to parse the plurality of messages outputted by the message handler in the second order.

11. The system of claim 1, comprising a message handler that is configured to:
provide a particular reply message to a sender of the received message,
provide a request for feedback regarding the particular reply message, and
receive the feedback regarding the particular reply message.

12. The system of claim 11, wherein the classifier is configured to use the feedback to identify that the received message is associated with a third category of the two or more categories, wherein the third category is different from the first category and the second category.

13. The system of claim 11, wherein the classifier is configured to use the feedback to identify, based on the received message, another reply message that is different from the particular reply message, and wherein the message handler is configured to provide the particular reply message to the sender of the received message.

14. The system of claim 1, wherein the classifier is configured to:
compare the first score to a first threshold associated with the first category; and
compare the second score to a second threshold associated with the second category, wherein the received message is associated with the first category responsive to the first score exceeding the first threshold and his associated with the second category responsive to the second score exceeding the second threshold.

15. The system of claim 14, wherein the first threshold is different from the second threshold.

16. A method, comprising:
  parsing, by one or more devices, a received message to identify one or more terms in the received message;
  comparing, by the one or more devices, the one or more terms parsed from the received message to terms in a plurality of previously received messages, wherein the previously received messages are classified in a data storage as stored classified messages with respect to two or more categories, wherein each category of the two or more categories is within a hierarchy of categories, wherein each level in the hierarchy below a topmost level further refines a category of information that is within an above level, and wherein at least one of the terms in the plurality of previously received messages is associated with at least two categories within the hierarchy of categories;
  generating, by the one or more devices, a plurality of scores for the received message based on the comparing, wherein each score of the plurality of scores, indicates a probability that the received message is related to a particular category of the two or more categories, wherein a first score of the plurality of scores is associated with a first category of the two or more categories, and wherein a second score of the plurality of scores is associated with a second category of the two or more categories that is different from the first category and that is at a same level within the hierarchy of categories as the first category;
  comparing, by the one or more devices, the first score to a first threshold;
  identifying, by the one or more devices and based on comparing the first score to the first threshold, that the received message is associated with the first category of the two or more categories;
  comparing, by the one or more devices, the second score to a second threshold that is different from the first threshold; and
  identifying, by the one or more devices and based on comparing the second score to the second threshold, that the received message is associated with the second category of the two or more categories.

17. The method claim 16, further comprising:
  providing, by the one or more devices, a particular reply message to a destination in response to the received message, wherein the particular reply message is based on the identified first category and the identified second category; and
  adding a copy of the received message and information in the reply message to the classifier, wherein the classifier updates the data storage.

18. The method of claim 16, wherein the generating of the plurality of scores includes identifying relative Bayesian probabilities of the terms with respect to the first category and the second category.

19. The method of claim 16, comprising determining a normalized aggregate score for the received message.

20. The method of claim 16, comprising providing the particular reply message and at least a portion of the first previously received message to a sender of the received message.

21. The method of claim 16, comprising updating a classification made of the received message based on a classification code.

22. The method of claim 21, comprising storing the received message and one or more of the following: answer content related to the received message, the classification code, information identifying the first category, and information identifying the second category.

23. The method of claim 16, comprising:
  identifying a first received message associated with a first user;
  identifying a second received message associated with a second user who is associated with a lower priority than the first user;
  identifying one or more priority terms in the second message; and
  processing the second message before processing the first message, based on identifying the one or more priority terms in the second message.

* * * * *